United States Patent

Nagai

[11] Patent Number: 5,822,332
[45] Date of Patent: Oct. 13, 1998

[54] PSEUDONOISE CODE PULL IN CIRCUIT

[75] Inventor: Hiroshi Nagai, Tokyo, Japan

[73] Assignee: Ando Electric Co., Ltd., Tokyo, Japan

[21] Appl. No.: 816,836

[22] Filed: Mar. 13, 1997

[30] Foreign Application Priority Data

Mar. 28, 1996 [JP] Japan .................................. 8-099410

[51] Int. Cl.$^6$ .................................................. G06F 11/00
[52] U.S. Cl. ........................ 371/5.4; 371/47.1; 371/27.2
[58] Field of Search .................. 371/5.4, 5.1, 46, 371/47.1, 67.1, 68.1, 68.2, 22.33, 27.1, 27.2, 27.7; 364/266.1, 266.4, 945.9; 375/362, 365, 367, 208

[56] References Cited

U.S. PATENT DOCUMENTS

| | | | |
|---|---|---|---|
| 4,232,387 | 11/1980 | Cottatellucci | 371/5.4 |
| 4,788,696 | 11/1988 | Sakane et al. | 371/5.4 |
| 5,455,536 | 10/1995 | Kono et al. | 371/5.4 |
| 5,619,509 | 4/1997 | Maruyama et al. | 371/5.4 |

*Primary Examiner*—Trinh L. Tu
*Attorney, Agent, or Firm*—Flynn, Thiel, Boutell & Tanis, P.C.

[57] ABSTRACT

A pseudonoise (PN) code pull in circuit is capable of shortening a time necessary for synchronously pulling in the reception PN code in an error code measuring circuit. In order to solve the problem, the PN code pull in circuit of the invention is constructed such that the reference PN code read out by the PN code generating circuit in the reverse sequence and the reception PN code are compared by a first comparator to detect a coincidence, and the reception PN code delayed for one clock and the reference PN code are compared by a second comparator to detect a coincidence. Furthermore, from the comparison results by the first and second comparators, one that is coincident is selected by the selection circuit, the error number of the code is counted by the error counter, and the forward or reverse sequence of the PN code generated by the PN code generating circuit is made switchable.

10 Claims, 3 Drawing Sheets

PSEUDONOISE CODE PULL IN CIRCUIT

BACKGROUND OF THE INVENTION

1. Field of the Invention

The present invention relates to a pull in circuit, particularly to a PN (pseudonoise) code pull in circuit that synchronously pulls in a reception PN code in a circuit for measuring a PN code error.

2. Description of the Related Art

A code error measuring circuit for measuring errors of a reception PN code train compares a reception PN code train with a reference PN code internally generated to measure errors. In order to measure the error, it is necessary to pull in the reference PN code synchronously with the reception PN code. Conventionally, in order to pull in synchronization, the reference PN code is delayed one clock each to the reception PN code to pull in synchronization.

FIG. 4 is a block diagram showing a construction of a conventional PN pull in circuit. In FIG. 4, a clock signal 101A from a clock input terminal 101 is distributed to a gate circuit 6 and to an error counter 3 to count the errors.

A clock control input signal 200A is introduced to a control terminal 200. This clock control input signal 200A is fed to the gate circuit 6.

If the gate circuit 6 is in a state not gating the clock control input signal 200A, the gate circuit 6 passes the clock signal 101A from the clock input terminal 101 and sends a clock signal 61 to a PN code generating circuit 7.

The PN code generating circuit 7 sequentially generates a reference PN code 71 based on the received clock signal 61 and sends it to a comparator 2. The comparator 2 compares a reception PN code 102A entered from a reception PN code input terminal 102 with the reference PN code 71. A comparison result 21 by the comparator 2 is sent to an ENABLE terminal of the error counter 3.

The error counter 3, based on the state of the comparison result 21, counts the clock signal 101A. The counted result by the error counter 3 is supplied from an error enumerated value output terminal 105.

If an error enumerated value 105A by the error counter 3 exceeds a specific value, synchronization is judged not pulled in, and the gate circuit 6 for controlling the clock signal 61 receives the clock control input signal 200A to stop the clock.

When the clock control input signal 200A enters the gate circuit 6, the gate circuit 6 stops to supply the clock signal 61, and to comply with, the PN code generating circuit 7 delays generation of the reference PN code 71 to the reception PN code 102A. This operation is repeated till the reception PN code 102A coincides with the reference PN code 71 to have synchronization pulled in.

Assuming that the reception PN code at a certain time t is A, the reference PN code is B, and a deviation to the reception PN code A is n, the foregoing operation is expressed in an equation as follows.

$$A = B + n$$

If a delay required till the reception PN code A coincides with the reference PN code B is i, the following equation is given in a synchronized state.

$$B + i = A$$
$$= B + n$$

Therefore, i=n is obtained. The deviation n can take on from 0 through PN code cycle, and it is necessary to delay the PN code cycle at maximum.

In the conventional PN code pull in circuit, the reference PN code is delayed clock by clock to coincide with the reception PN code; and therefore, the conventional circuit has a problem that it takes more time to get synchronization, as the PN code length becomes longer.

SUMMARY OF THE INVENTION

In order to solve the foregoing problem, the PN code pull in circuit according to the present invention is composed of a PN code generating circuit 1 for generating a reference PN code of which sequence of generation is switched into the forward or the reverse sequence by the control of a control means, a comparator 2A for comparing a reception PN code with the foregoing reference PN code, delay means 4 for delaying the foregoing reception PN code for one clock, a comparator 2B for comparing the foregoing reception PN code delayed by the delay means 4 with the foregoing reference PN code, a selection circuit 5 for selecting one of a comparison result by the comparator 2A or a comparison result by the comparator 2B that is coincident in the comparison result, and an error counter 3 for counting the error number of the PN code from the comparison result selected by the selection circuit 5.

DESCRIPTION OF THE PREFERRED EMBODIMENT

According to the invention, the comparator 2A compares the reference PN code generated by the PN code generating circuit 1 with the reception PN code, the comparator 2B compares the reception PN code delayed for one clock with the reference PN code, the selection circuit 5 selects one of the comparison results by the comparator 2A and 2B that is coincident, and the error counter 3 counts errors of the reception PN code and at the same time a control means 99 switches the sequence of the code generation into the forward sequence or the reverse.

Figure 1:
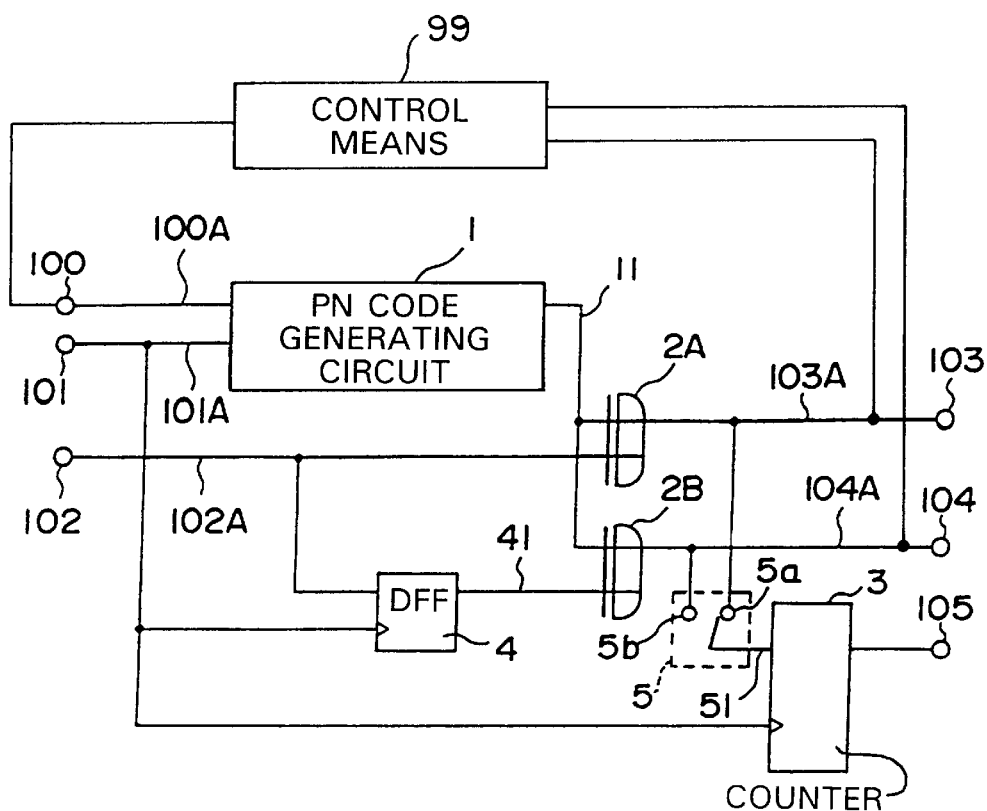
FIG. 1 is a block diagram showing a construction of a PN code pull in circuit according to one embodiment of the invention.

Next, preferred embodiments of the PN code pull in circuit according to the present invention will be described with reference to the accompanying drawings. FIG. 1 is a block diagram showing a construction of this embodiment. In FIG. 1, the PN code generating circuit 1 is provided with a control terminal for switching the forward or the reverse sequence.

The control signal 100A enters an input terminal of the PN code generating circuit 1 from the control terminal 100 to switch the sequence of the PN code into the forward sequence or the reverse. The clock signal 101A also enters the PN code generating circuit 1 from the clock input terminal 101.

On the other hand, the reception PN code 102A enters the comparator 2A and a D-type flip-flop 4 (hereafter, referred to as DFF) as the delay means 4 from the reception PN code input terminal 102. The foregoing clock signal 101A also enters the DFF 4.

In a state of synchronization pulled in, the control means 99 sets the control terminal 100 so that the PN code is generated in the reverse sequence. The PN code generating circuit 1 set to generate in the reverse sequence generates the reference PN code 11 in the reverse sequence, which is distributed to the comparators 2A and 2B.

The reception PN code 102A received at the reception PN code input terminal 102 is supplied to the comparator 2A and the DFF 4. The reception PN code 102A supplied by the DFF 4 is delayed for one clock by means of the clock signal 101A, and the delayed reception PN code enters the comparator 2B.

The comparator 2A compares the reception PN code 102A with the reference PN code 11, and supplies a coincidence signal 103A to a coincidence detecting signal terminal 103. The comparator 2B simultaneously compares a reception PN code 41 delayed for one clock by the DFF 4 with the reference PN code 11, and supplies a coincidence signal 104A to a coincidence detecting signal terminal 104.

The coincidence signal 103A and 104A are also applied to an input terminal 5a and 5b of the selection circuit 5, respectively. The selection circuit 5 selects either the coincidence signal 103A or 104A, and the selection output is supplied to the error counter 3. An output terminal of the error counter 3 is connected to an error counter output terminal 105 so that an error enumerated value 105A can be fed to the error counter output terminal 105 while errors are being measured.

When errors are measured, one of the coincidence signals 103A or 104A that the coincidence is detected is selected by the selection circuit 5. And, at the same time that the coincidence signal 103A or 104A is detected, the control means sets the control terminal 100 so that the PN code generating circuit 1 can generate the PN code in the forward sequence.

Figure 2:
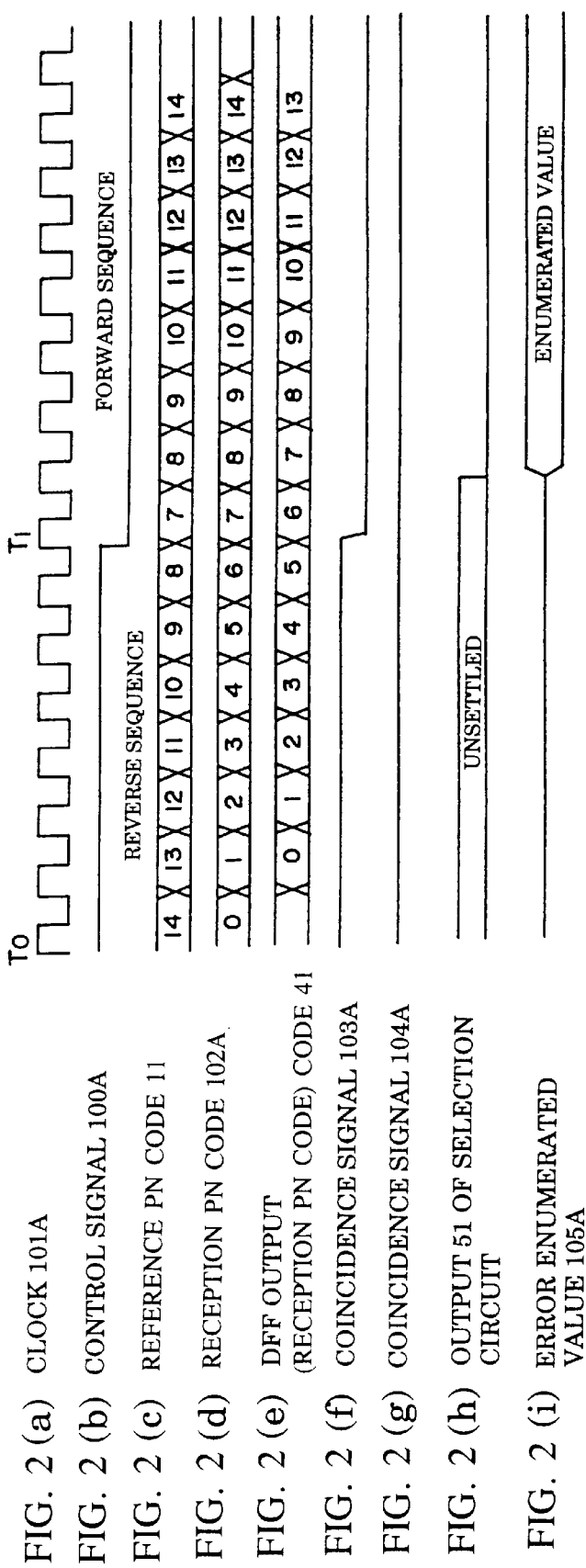
FIGS. 2(a)–2(i) are timing charts for explaining the operation of the embodiment in FIG. 1.

Next, the operation of the circuit relating to the embodiment of the invention will be described with reference to the time charts of FIGS. 2(a)–2(i), FIG. 2(a) shows the clock signal 101A introduced from the clock input terminal 101, FIG. 2(b) shows the control signal 100A introduced from the control terminal 100, FIG. 3(c) shows the reference PN code 11 supplied from the PN code generating circuit 1, and FIG. 2(d) shows the reception PN code 102A sent from the reception PN code input terminal 102.

Further, in FIG. 2(e) shows the reception PN code 41 given by the DFF 4, FIG. 2(f) and FIG. 2(g) show the coincidence signal 103A and 104A, respectively, FIG. 2(h) shows an output 51 of the selection circuit 5, and FIG. 2(i) shows the error enumerated value 105A. Furthermore, data numbers are applied to the data of the reference PN code 11, reception PN code 102A, and the reception PN code 41 to be understandable.

When the reference PN code 11 is "14" at time T0, the reception code 102A is assumed to be "0". The control terminal 100 is in the state of generating the code in the reverse sequence. In compliance with the clock signal 101A, the corresponding reference PN code 11 is generated in the reverse sequence "14, 13, 12, . . . ", as shown in FIG. 2(c).

At that moment, the reception PN code 102A is received, as shown in FIG. 2(d), in the forward sequence "0, 1, 2, 3, . . . ". The reception PN code 41 being the output from DFF 4 is delayed by one clock each to the reception PN code 102A shown in FIG. 2(d), giving "n, 0, 1, 2, . . . ".

When, at time T1, the reference PN code 11 becomes "7" and the reception PN code 102A becomes "7", the comparator 2A detects the coincidence of the two signals. The comparators 2A and 2B are to give "LOW" at coincidence, and "HIGH" at non-coincidence.

When the comparator 2A detects the foregoing coincidence, the coincidence signal 103A is given to the coincidence detection signal terminal 103 and at the same time the control means switches the control terminal 100 into the state of generating the forward sequence. Thereby the reference PN code 11 is generated in the forward sequence "7, 8, 9, . . . ", from time T1, and becomes synchronized with the reception PN code 102A.

In the example of FIGS. 2(a)–2(i), a coincidence is not detected in the reception PN code 41 supplied from the DFF 4 and the reference PN code 11 while the code is generated in the reverse sequence; even after the reference PN code 11 is switched to generate in the forward sequence, the reception PN code 41 does not synchronize with the reception PN code 102A. Therefore, at the same time when a coincidence is detected in the coincidence detection signal terminal 103, the selection circuit 5 is switched into either the coincidence detection signal terminal 103 or 104 that the coincidence signal 103A or 104A is given.

In this case, as clearly seen in FIG. 2(f), the coincidence signal 103A from the coincidence detection signal terminal 103 is given to the input terminal (5a) of the selection circuit 5, and the selection circuit 5 switches the output 51 into the side of the coincidence detection signal terminal (5a) so as to give the coincidence state of the reference PN code 11 and the reception PN code 102A.

The error counter 3 counts the number of errors from the coincidence state according to the comparison result of the reference PN code 11 with the reception PN code 102A by the comparator 2A, and the error enumerated value 105A is given to the error counter output terminal 105.

Assuming that the reference PN code is A, the reception PN code is B, and a deviation of A from B is n, the foregoing operation is expressed as follows.

$$B = A + n$$

If the necessary delay for the reference PN code is assumed to be i, in a synchronized state after shifting by i, $$A - i = B + i = A + n + i$$

is given.

Therefore, $i = -(n/2)$ is obtained. The deviation n can take on from 0 through the PN code cycle, and the maximum necessary delay will be half of the PN code cycle.

However, since i is an integer, in case that n is not the multiple of 2, a coincidence detection will not be obtained. In order to cope with this problem, a coincidence detection circuit is provided which detects a coincidence with (B+1) delayed for one clock on the side of the reception PN code.

In the embodiment shown in FIG. 1, a set of the DFF 4 and the comparator 2B are equivalent to the coincidence detection circuit with (B+1). Therefore, the time chart in FIGS. 2(a) to FIG. 2(i) show the embodiment in case that n is an even number.

Next, the PN code generating circuit 1 in FIG. 1 will be described in detail. The PN code is generated from a shift register consisting of n number of the DFFs and a feedback circuit by one exclusive OR. In the code generation of the forward sequence, the state of the m-th DFF at time t is equal to the state of the (m−1)-th DFF at time (t−1) because of the shift register. Therefore, the following equation (1) is given.

$$D_m(t)=D_{m-1}(t-1) \quad 1<m\leq n \tag{1}$$

In a feedback circuit of an exclusive OR, the exclusive OR by the n-th DFF and the i-th DFF at time (t−1) becomes equal to a state of the 1-st DFF at time t. Therefore the following equation (2) is given.

$$D_1(t)=D_i(t-1)_{XOR} D_n(t-1) \tag{2}$$

To generate the code in the reverse sequence, a state at time (t−1) is introduced from the state of DFF at time t. The foregoing equation (1) gives the following equation (3).

$$D_{m-1}(t-1)=D_m(t) \quad 1<m\leq n \tag{3}$$

This equation (3) expresses that the state of the (m−1)-th DFF at time (t−1) becomes equal to the state of the m-th DFF at time t.

The state of the n-th DFF at time (t−1) can be expressed as the following equation (4), from the equation (2).

$$\begin{aligned}D_n(t-1) &= D_1(t)XORDi(t-1) \\ &= D_1(t)XORD_{i+1}(t)\end{aligned} \tag{4}$$

This equation (4) expresses that the state of the n-th DFF at time (t−1) becomes equal to the exclusive OR of the state by the 1-st DFF and the state of the (i+1)-th DFF at time t.

Figure 3:
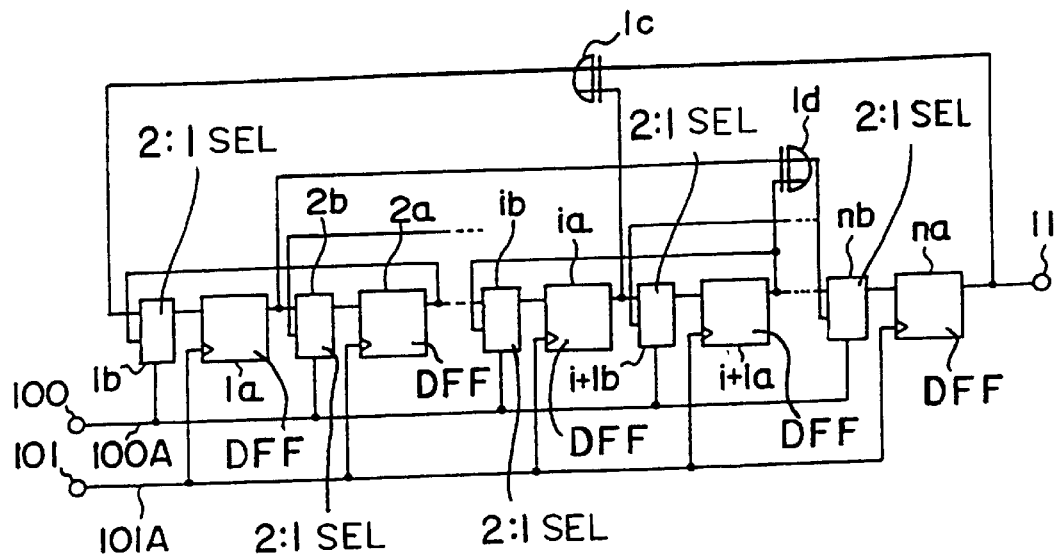
FIG. 3 is a block diagram showing a construction of a PN code generating circuit in the PN code pull in circuit in FIG. 1 relating to the embodiment.
Figure 4:
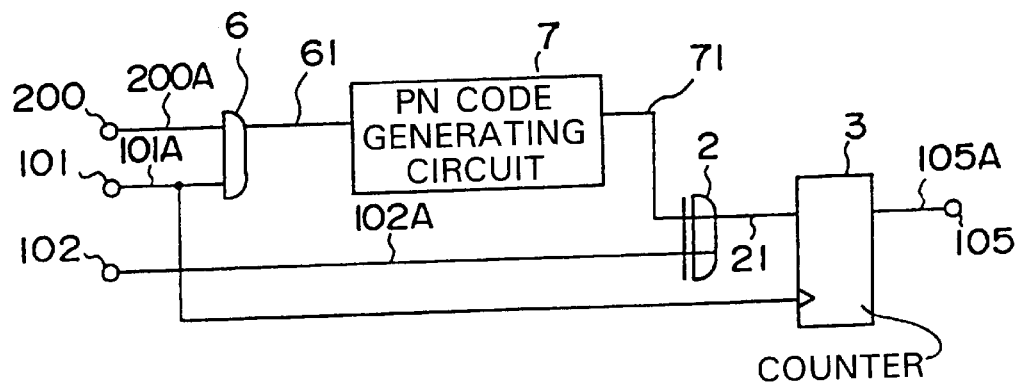
FIG. 4 is a block diagram showing a construction of a conventional PN code pull in circuit.

FIG. 3 illustrates a circuit construction of the PN code generating circuit 1 relating to the embodiment. In FIG. 3, the outputs of two-to-one selectors 1b to nb enter D input terminals of the DFFs 1a to na, respectively, that are cascaded to constitute a shift register, and the clock signal 101A enters each of the DFFs 1a to na from the clock input terminal 101.

The control signal 100A from the control terminal 100 enters each of the input terminals of the two-to-one selectors 1b to nb.

The output signal from the i-th DFF ia and the output signal from the final stage DFF na enter an exclusive OR circuit 1c, the output signal from which enters an input terminal A of the first stage two-to-one selector 1b.

Furthermore, the output signal from the first stage DFF 1a and the output signal from the (i+1)-th DFF i+la enter an exclusive OR circuit 1d, the output signal from which enters an input terminal B of the final stage two-to-one selector nb. Here, the suffixes in FIG. 3 each correspond to the suffixes in the equation (1) through (4). Each of the DFFs 1a to na holds the next data every time the clock signal 101A comes in from the clock terminal 101.

The two-to-one selectors 1b to nb each select the outputs of the DFFs 1a to na by means of the control signal 100A, and the selected outputs each enter the DFFs 1a to na to select the forward or reverse sequence of generation.

To be more concrete, the input terminal A of the two-to-one selector 2b connected to the data input of the DFF 2a receives the output from the DFF 1a at one prior stage, and the input terminal B of the two-to-one selector 2b receives the output from the DFF 3a at one subsequent stage. Here, the inputs to the input terminals A of the two-to-one selectors are served as the forward sequence generation and the inputs to the input terminals B are served as the reverse sequence generation.

The exclusive OR circuit 1c is to embody the foregoing equation (2) as a feedback circuit in generating the forward sequence. The exclusive OR circuit 1c receives the output from the n-th DFF na and the output from the i-th DFF 1a to produce the output of the exclusive OR circuit 1d, which enters the input terminal A of the two-to-one selector 1b in order to be applied to the DFF 1a.

The exclusive OR circuit 1d is to embody the foregoing equation (4) as a feedback circuit in generating the reverse sequence. The exclusive OR circuit 1d receives the output from the 1-st DFF 1a and the output from the (i+1)-th DFF i+1a to produce the output of exclusive OR, which enters the input terminal B of the two-to-one selector nb in order to be applied to the DFF 1n. The control signal 100A switches the sequence of generating the reference PN code 11 from the forward (reverse) sequence to the reverse (forward).

According to the pull in circuit of the invention, the reference PN code read out by the PN code generating circuit in the reverse sequence and the reception PN code are compared by a first comparator to detect a coincidence, and the reception PN code delayed for one clock by the delay means and the reference PN code are compared by a second comparator to detect a coincidence. From the comparison results by the first and second comparators, one that is coincident is selected by the selection circuit, the error enumerated value is counted by the error counter, and the forward or reverse sequence of code generation by the PN code generating circuit is made switchable; thereby the coincidence can be detected by the half number of clocks and the pull in of synchronization can be done at a high speed.

While the specific embodiment of the invention has been illustrated and described herein, it is realized that numerous modifications and changes will occur to those skilled in the art. Therefore, it should be understood that the appended claims are to cover all such modifications and changes as fall within the true spirit and scope of the invention.

What is claimed is:

1. A pseudonoise (PN) code pull in circuit for measuring the error of a reception PN code, said code pull in circuit comprising:

a PN code generating circuit for generating a sequentially changing reference PN code signal, wherein said PN code generating circuit is configured to selectively generate the reference PN code signal in a forward sequence or in a reverse sequence in response to a control signal generated by a control unit;

a comparator assembly for receiving a reception PN code signal, the reference PN code signal and clock pulses, said comparator assembly including:

a first comparator for comparing the reception PN code signal to the reference PN code signal, said first comparator generating a first coincidence signal when the reception PN code signal and the reference PN code signal coincide;

delay means for producing a delayed reception PN code signal that is delayed from the reception PN code signal by one clock pulse; and a second comparator for comparing the delayed reception PN code signal to the reference PN code signal simultaneously with the comparison performed by said first comparator, said second comparator generating a second coincidence signal when the delayed reception PN code signal and the reference PN code signal coincide; and a counter assembly including:

a counter for receiving the clock pulses and one of the coincidence signals for generating an error signal based on the number of clock pulses received before the one coincidence signal is received; and a selection circuit connected between said comparators and said counter for first receiving the first and second coincidence signals and forwarding one of the received coincidence signals to said counter so that said counter receives one of the first or second coincidence signals when either coincidence signal is generated, wherein: said PN code generating circuit generates the reference PN code signal in the reverse sequence prior to either the reception PN code signal or the delayed reception PN code signal coinciding with the reference PN code signal; prior to either the reception PN code signal or the delayed PN reception code coinciding with the reference PN code signal, said first comparator and said second comparator simultaneously, respectively, compare the reception PN code signal and the delayed reception PN code signal to the reference PN code signal; and, when one of said first or second comparators generates a coincidence signal indicating that either the reception PN code signal or the delayed reception PN code signal coincides with the reference PN code signal, said PN code generating circuit is transitioned by the control unit to start generating the reference PN code signal in the forward sequence and said counter generates the error signal representative of the reception PN code error.

2. The pseudonoise code pull in circuit of claim 1, wherein said delay means is a flip-flop that receives the reception PN code signal and the clock pulses so as to produce the delayed reception PN code signal.

3. A pseudonoise (PN) code pull in circuit for measuring the error of a reception PN code, said code pull in circuit comprising:

a PN code generating circuit for generating a sequentially changing reference PN code signal, wherein said PN code generating circuit is configured to selectively generate the reference PN code signal in a forward sequence or in a reverse sequence in response to a PN code control signal;

a comparator assembly for receiving a reception PN code signal, the reference PN code signal and clock pulses, said comparator assembly including:

a first comparator for comparing the reception PN code signal to the reference PN code signal, said first comparator generating a first coincidence signal when the reception PN code signal and the reference PN code signal coincide;

delay means for producing a delayed reception PN code signal that is delayed from the reception PN code signal by one clock pulse; and a second comparator for comparing the delayed reception code signal to the reference PN code signal simultaneously with the comparison performed by said first comparator, said second comparator generating a second coincidence signal for when the delayed reception PN code signal and the reference PN code signal coincide;

a counter assembly including:

a selection circuit connected to said first and second comparators for receiving the first and second coincidence signals and forwarding one of the received coincidence signals; and a counter for receiving the clock pulses and connected to said selection circuit for receiving the forwarded coincidence signal for generating an error signal based on the number of clock pulses received before the received coincidence signal is received; and control means connected to said first and second comparators for receiving the first and second coincidence signals and to said PN code generating circuit for generating the PN code control signal, wherein said control means initially generates a first PN code control signal to cause said PN code generating circuit to generate the reference PN code signal in reverse sequence, and when either the first or second coincidence signal is received by said control means, said control means generates a second PN code control signal to cause said PN code generating circuit to generate the reference PN code signal in forward sequence.

4. The pseudonoise code pull in circuit of claim 3, wherein said delay means is a flip-flop that receives the reception PN code signal and the clock pulses so as to produce the delayed reception PN code signal.

5. A method of measuring the code error of a reception pseudonoise (PN) code signal, said method comprising the steps of:

receiving a reception PN code signal that varies in an ordered sequence;

generating a reference PN code signal in a sequence that is reversed relative to the sequence of the reception PN code signal;

performing a first comparison of the reception PN code signal with the reference PN code signal and, when said first comparison indicates the reception PN code signal and the reference PN code signal coincide, generating a first coincidence signal;

producing a delayed reception PN code signal from the reception PN code signal, wherein the delayed reception PN code signal is the reception PN code signal delayed by a clock pulse;

simultaneously with said first comparison, performing a second comparison of the delayed reception PN code signal with the reference PN code signal and, when said second comparison indicates the delayed reception PN code signal and the reference PN code signals coincide, generating a second coincidence signal;

generating an error signal representative of the difference between the reception PN code signal and the reference PN code signal by evaluating when either the first or second coincidence signal is generated; and upon said first or second coincidence signal being generated, generating the reference PN code signal in a sequence that is in the same orientation as the sequence of the reception PN signal.

6. The method of measuring code error of claim 5, wherein during said generation of the reference PN code signal, the reference PN code is changed with each clock pulse.

7. The method of measuring code error of claim 6, wherein said generation of the error signal is performed with a counter configured to receive the first and second coincidence signals and the clock pulses upon which the reference PN code is changed, and said counter generates the error signal by counting the number of clock pulses that are received before the counter receives either the first coincidence signal or the second coincidence signal.

8. The method of measuring code error of claim 5, wherein said step of producing a delayed reception PN code signal is produced with a flip-flop to which the reception PN code signal and clock pulses are applied.

9. The method of measuring code error of claim 8, wherein said generation of the error signal is performed with a counter configured to receive the first and second coincidence signals and the clock pulses upon which the delayed reception code signal is produced, and said counter generates the error signal by counting the number of clock pulses that are received before the counter receives either the first coincidence signal or the second coincidence signal.

10. The method of measuring code error of claim 5, wherein said generation of the error signal is performed with a counter configured to receive the first and second coincidence signals and a set of clock pulses, and said counter generates the error signal by counting the number of clock pulses that are received before the counter receives either the first coincidence signal or the second coincidence signal.

* * * * *